United States Patent [19]

Spurlock

[11] Patent Number: 5,269,253
[45] Date of Patent: Dec. 14, 1993

[54] VISUAL BRAKE ROD POSITION INDICATOR

[76] Inventor: Herschel G. Spurlock, P.O. Box 611895, San Jose, Calif. 95161

[21] Appl. No.: 926,150

[22] Filed: Aug. 5, 1992

Related U.S. Application Data

[63] Continuation of Ser. No. 797,112, Nov. 20, 1991, abandoned, which is a continuation of Ser. No. 656,699, Feb. 19, 1991, abandoned.

[51] Int. Cl.⁵ .............................................. G01D 7/00
[52] U.S. Cl. .................................................. 116/208
[58] Field of Search ...................... 116/208, 281, 283; 188/1.11; 411/539

[56] References Cited

U.S. PATENT DOCUMENTS

| | | | |
|---|---|---|---|
| 760,914 | 5/1904 | Newberry | 411/539 |
| 1,611,567 | 12/1926 | Sonen | 411/539 |
| 3,495,496 | 2/1970 | Keim | 411/539 |
| 4,279,214 | 7/1981 | Thorn | 116/208 |
| 4,800,991 | 1/1989 | Miller | 188/1.11 |
| 4,945,818 | 8/1990 | Ware | 188/1.11 |
| 4,989,537 | 2/1991 | Hutchinson, Sr. et al. | 116/208 |
| 4,991,310 | 2/1991 | Melia | 116/208 |

FOREIGN PATENT DOCUMENTS 2110334 6/1983 United Kingdom ............... 188/1.11

Primary Examiner—William A. Cuchlinski, Jr.
Assistant Examiner—John L. Beres

[57] ABSTRACT

A marker, instalable without tools on a push rod of an air brake piston for determining the axial movement of the push rod during application of the brake.

2 Claims, 1 Drawing Sheet

VISUAL BRAKE ROD POSITION INDICATOR

This application is a continuation of application Ser. No. 07/797,112 filed on Nov. 20, 1991, now abandoned, which is a continuation application of pending patent application Ser. No. 07/656,699 filed Feb. 19, 1991 now abandoned.

BACKGROUND OF THE INVENTION

The commonly used method of adjusting and checking the air chamber push rod travel is very deceiving. Most mechanics and drivers alike, may do a brake adjustment and then never really visually check the very critical item of how far the air chamber push rod actually moves when the brakes are applied. Some prior art devices designed for checking travel of air chamber push rods consist of several parts, which make them costly and time consuming to install. As they were intended to be permanently installed on the vehicle. The devices currently being used seem to have missed a very critical area concerning air brake adjustment, it is the need to visually check all brakes to be sure they are equally adjusted or balanced. This will provide a much safer and controllable stopping condition. The improper adjustment and balancing of the air brakes in the past have contributed to many accidents. It is especially dangerous on long down hills, as improperly adjusted brakes will cause more heat buildup and possible fire and failure. Those concerned with the safety of heavy duty highway vehicles will recognize the extreme importance of a tool to quickly indicate if any brake needs adjustment or repair.

It is one objective of the present invention to provide an inexpensive tool that will promote a safer braking system for heavy duty highway trucks and buses. It provides for a visual quick check of the air chamber push rod travel, so that mechanics and drivers can tell if any brake work is needed. The present invention is inexpensive, versatile and easy to use; it can be left in place on the air chamber push rod for a quick visual check of the vehicle brake adjustment and balance condition at anytime. The present invention can greatly add to the straight line stopping or staying in its own traffic lane under severe stopping conditions of heavy duty trucks and busses. All that is needed is a visual check to see if both front brakes are adjusted equally or balanced as the Department of Transportation requires.

The present invention is a tool to indicate the position of the air chamber push rod in an air brake system that is attached to the undercarriage of a vehicle. The air brake system includes an air supply, an air chamber with a movable push rod attached to a slack adjuster, then to a shaft that activates the brake shoes. Upon brake application, air is introduced into the air chamber from the air supply. This causes outward movement of the push rod from within the air chamber. This outward movement of the push rod from the air chamber is the criterium that is used by the Department of Transportation and Highway Patrol in their safety inspection. Push rod travel during brake application relates directly to brake adjustment. With the brakes un-applied, inspectors make a chalk mark on the push rod at the air chamber. Then with the brakes applied, they check the distance the push rod and chalk mark have moved away from the air chamber. Any movement over 2" is a citation. The present invention, a visual brake rod position indicator, is a plastic washer with a center hole, just slightly smaller than the air chamber push rod. It also has a wedge cut out from the outside edge to the center hole. With the wedge removed it will allow the flexing of the washer by bending the open ends in opposite directions and allowing it to be slipped of the air chamber push rod. The placement of this washer along the push rod near the air chamber, where the inspection chalk mark is normally applied will enable a mechanic, driver or inspector to tell at a glance if the brake conditions are acceptable or need attention. While the chalk mark doesn't last long, this indicating tool is very durable, easy to see and will encourage proper adjustment and maintenance of air brake systems.

DESCRIPTION OF THE PREFERRED EMBODIMENT

Figure 1:
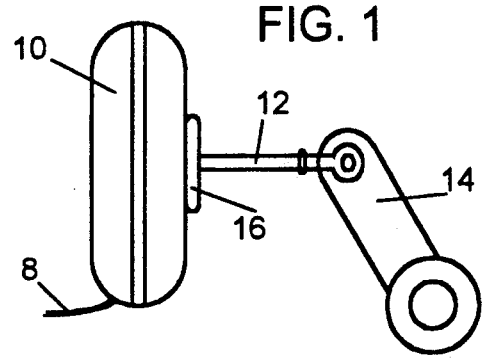
FIG. 1 is a simplified illustration of a typical air brake system with an installed indicator of the present invention shown in the brake un-applied position.

The brake rod position indicator provides a very important tool to aid in the visual inspection of the distance the push rod travels out of the air chamber when the brakes are applied. FIG. 1 is a simplified illustration of a typical air brake system with an installed indicator of the present invention shown in the brake un-applied position. Air chamber 10 of the air brake system is connected to an air supply via hose 8 and attached to the under carriage or axle of a heavy duty vehicle, such as a truck and bus. The arrangement is shown in the un-applied brake position. In FIG. 1 it is shown that push rod 12 is retracted back into air chamber 12, this is the brake un-applied position. Slack adjuster 14, which is controlled by the action of push rod 12 causes a brake to be applied or released. Visual brake rod position indicator 16 is a plastic tool that can be easily slipped over push rod 12 and placed against air chamber 10 when the brakes are in the un-applied position as illustrated in FIG. 1.

Figure 2:
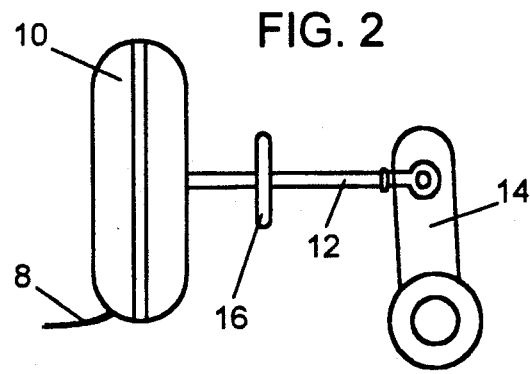
FIG. 2 is a simplified illustration of a typical air brake system with an installed indicator of the present invention shown in the brake applied position.
Figure 3:
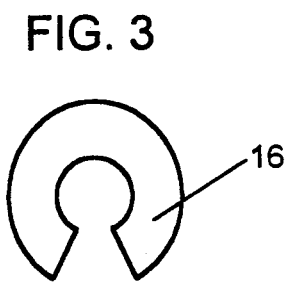
FIG. 3 is an illustration of the indicator of the present invention.

FIG. 2 is a simplified illustration of a typical air brake system with an installed indicator of the present invention. Air chamber 10 is operably connected to an air supply via hose 8 and attached to the under carriage or axle of a heavy duty vehicle, such as a truck or a bus. In FIG. 2 push rod 12 and slack adjuster 14 are shown in the brakes applied position.

In FIG. 2 push rod 12 is in the extended position. It also shows that indicator 16 has followed push rod 12 away from air chamber 10. This movement of indicator 16 will allow a driver or mechanic a very accurate indication of their vehicle's brake adjustment. The use of indicators of the present invention on all push rods of a vehicle would enable the driver or mechanic to visually determine if all brakes are adjusted equally. This would improve the ability of that vehicle to stop in a straight line under severe braking conditions. The excess wear of brake part components will often cause push rod 12 to overextend or travel too far and cause a very unsafe braking system. Therein lies the need for the use of the indicator of the present invention to visually determine if push rod 12 travel is within specification.

Visual brake rod position indicator 16 is made of flexible plastic and is cylindrical in shape with a center hole just slightly smaller than air chamber push rod 12. Indicator 16 has a sufficiently large pie shaped notch removed from the outside edge leading into the center hole for installing indicator 16 on brake rod 12. During installation indicator 16 is slightly deformed but regains shape to sit securely on brake rod 12.

The above description of my invention is just an example of the preferred embodiment. Many variations are possible. For example, a clip type pin of metal or plastic that has an open end of a configuration that would allow it to be pushed over the brake rod and with enough tension in it to allow it to remain in its applied position. Another type could be similar to the clothes pin type that could be clipped to the push rod. Therefore, the scope of the invention should be determined not by the embodiment illustrated, but by the appended claims.

I claim:

1. A replaceable axial travel marker for an air brake push rod comprising an outer rim, a circular inner opening and a cut-out from said outer rim to said circular inner opening, said circular inner opening conforming with the circumference of said push rod and having a diameter slightly smaller than the outer diameter of said push rod to provide a frictionally secured position of said marker on said push rod, said cut-out having a first width at said outer rim and a second width at said inner opening;

said first width being larger than the diameter of said inner opening, said second width being smaller than the diameter of said inner opening;

said marker being adapted at said cut-out for elastic expansion near said second width to the diameter of said push rod during slipping said marker over said push rod and contraction thereby frictionally securing said marker in a desired position on said push rod.

2. A replaceable axial travel marker for an air brake push rod as claimed in claim 1, wherein said outer rim of said marker is circular.

* * * * *